US012384185B2

(12) United States Patent
Luo et al.

(10) Patent No.: US 12,384,185 B2
(45) Date of Patent: Aug. 12, 2025

(54) METHODS, SYSTEMS, AND APPARATUS FOR INKJET PRINTING SELF-ASSEMBLED MONOLOAYER (SAM) STRUCTURES ON SUBSTRATES

(71) Applicant: Applied Materials, Inc., Santa Clara, CA (US)

(72) Inventors: Yingdong Luo, Newark, CA (US); Rami Hourani, Santa Clara, CA (US); Xiaopei Deng, San Jose, CA (US); Kang Luo, San Jose, CA (US); Erica Chen, Cupertino, CA (US); Ludovic Godet, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 304 days.

(21) Appl. No.: 18/142,305

(22) Filed: May 2, 2023

(65) Prior Publication Data

US 2023/0356540 A1 Nov. 9, 2023

Related U.S. Application Data

(60) Provisional application No. 63/339,279, filed on May 6, 2022.

(51) Int. Cl.

*B41M 5/00* (2006.01)
*B41J 2/01* (2006.01)
*B41J 11/00* (2006.01)

(52) U.S. Cl.

CPC .............. *B41M 5/0047* (2013.01); *B41J 2/01* (2013.01); *B41J 11/00* (2013.01)

(58) Field of Classification Search

CPC ........... B41M 5/0047; B41J 2/01; B41J 11/00
See application file for complete search history.

(56) References Cited

U.S. PATENT DOCUMENTS

| | | | | |
|---|---|---|---|---|
| 7,098,145 | B2 | 8/2006 | Fukushima et al. | |
| 8,911,063 | B2 | 12/2014 | Watanabe et al. | |
| 2004/0183220 | A1 * | 9/2004 | Dalmia ................ | G02B 5/1857 264/2.5 |

(Continued)

FOREIGN PATENT DOCUMENTS

| | | | |
|---|---|---|---|
| CN | 103346123 | A | 10/2013 |
| CN | 111688189 | A | 9/2020 |
| WO | 2008006060 | A1 | 1/2008 |

OTHER PUBLICATIONS

International Search Report and Written Opinion dated Aug. 24, 2023 for Application No. PCT/US2023/020705.

*Primary Examiner* — Yaovi M Ameh
(74) *Attorney, Agent, or Firm* — Patterson + Sheridan, LLP

(57) ABSTRACT

Embodiments of the present disclosure relate to methods, systems, and apparatus for inkjet printing self-assembled monolayer (SAM) structures on substrates. In one embodiment, which can be combined with other embodiments, one or more SAM layers are printed on a substrate surface of a substrate in a localized manner such that a portion of the substrate surface is left exposed to a processing region of the inkjet chamber. The printing includes spraying one or more subsections of the substrate surface with an ink, the ink having a SAM composition. The SAM composition includes an active component, and a hydrophobic tail.

21 Claims, 8 Drawing Sheets

(56) References Cited

U.S. PATENT DOCUMENTS

| | | | | |
|---|---|---|---|---|
| 2013/0194350 | A1* | 8/2013 | Watanabe | B05C 9/10 118/620 |
| 2014/0000476 | A1 | 1/2014 | Portet et al. | |
| 2015/0359094 | A1* | 12/2015 | Nitzan | H01L 21/306 347/110 |
| 2021/0016589 | A1 | 1/2021 | Washio et al. | |
| 2022/0091314 | A1 | 3/2022 | Luo et al. | |

* cited by examiner

METHODS, SYSTEMS, AND APPARATUS FOR INKJET PRINTING SELF-ASSEMBLED MONOLOAYER (SAM) STRUCTURES ON SUBSTRATES

CROSS-REFERENCE TO RELATED APPLICATION

This application claims priority to U.S. provisional patent application Ser. No. 63/339,279, filed May 6, 2022, which is herein incorporated by reference in its entirety.

BACKGROUND

Field

Embodiments of the present disclosure relate to methods, systems, and apparatus for inkjet printing self-assembled monolayer (SAM) structures on substrates.

Description of the Related Art

Surfaces energies and hydrophilicities of substrates can be used in processing operations. However, operations that seek to configure surface energies and/or hydrophilicities can be complex, expensive, and time-consuming. As an example, operations can involve several operations that would otherwise be unnecessary. Moreover, operations can fail to establish spatial control for surface energies and/or hydrophilicities.

Therefore, there is a need for improved methods, systems, and apparatus that facilitate spatial control in a manner that is simple, cost-effective, and time-efficient.

SUMMARY

Embodiments of the present disclosure relate to methods, systems, and apparatus for inkjet printing self-assembled monolayer (SAM) structures on substrates. In one embodiment, which can be combined with other embodiments, one or more SAM layers are printed on a substrate surface of a substrate in a localized manner such that a portion of the substrate surface is left exposed to a processing region of the inkjet chamber. The printing includes spraying one or more subsections of the substrate surface with an ink, the ink having a SAM composition. The SAM composition includes an active component, and a hydrophobic tail.

In one embodiment, which can be combined with other embodiments, a method of forming a self-assembled monolayer (SAM) structure includes positioning a substrate in an inkjet chamber, and printing one or more SAM layers on a substrate surface of the substrate in a localized manner such that a portion of the substrate surface is left exposed to a processing region of the inkjet chamber. The printing includes spraying one or more subsections of the substrate surface with an ink. The ink includes a SAM composition. The SAM composition includes an active component, and a hydrophobic tail. The method includes allowing the one or more SAM layers to react with the substrate surface.

In one embodiment, which can be combined with other embodiments, a non-transitory computer readable medium includes instructions that, when executed, cause a plurality of operations to be conducted. The plurality of operations includes activating a substrate surface of a substrate, and printing one or more SAM layers on the substrate surface of the substrate in a localized manner such that a portion of the substrate surface is left exposed to a processing region of the inkjet chamber. The printing includes spraying one or more subsections of the substrate surface with an ink. The ink includes a SAM composition. The SAM composition includes an active component, and a hydrophobic tail. The plurality of operations includes curing the one or more SAM layers, and allowing the one or more SAM layers to react with the substrate surface.

In one embodiment, which can be combined with other embodiments, a system for processing substrates includes an inkjet chamber configured to conduct a printing operation, a stage positioned in the inkjet chamber, and an inkjet printer head positioned in the inkjet chamber. The system includes an activation chamber configured to conduct an activation operation, and a curing chamber configured to conduct a curing operation. The system also includes a controller communicatively coupled to the stage, the inkjet printer head, the activation chamber, and the curing chamber. The controller includes instructions that, when executed, cause a plurality of operations to be conducted. The plurality of operations includes printing one or more SAM layers on a substrate surface of a substrate in a localized manner such that a portion of the substrate surface is left exposed to a processing region of the inkjet chamber. The printing includes the inkjet printer head spraying one or more subsections of the substrate surface with an ink. The ink includes a SAM composition. The SAM composition includes an active component, and a hydrophobic tail. The plurality of operations includes allowing the one or more SAM layers to react with the substrate surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments of the present disclosure and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to methods, systems, and apparatus for inkjet printing self-assembled monolayer (SAM) structures on substrates. In one embodiment, which can be combined with other embodiments, one or more SAM layers are printed on a substrate surface of a substrate in a localized manner such that a portion of the substrate surface is left exposed to a processing region of the inkjet chamber. The printing includes spraying one or more subsections of the substrate surface with an ink, the ink having an SAM composition. The SAM composition includes an active component, and a hydrophobic tail.

Unless specified otherwise, the chemicals referred to herein can have any number of atoms for the elements included (e.g., stoichiometric or non-stoichiometric).

Figure 1:
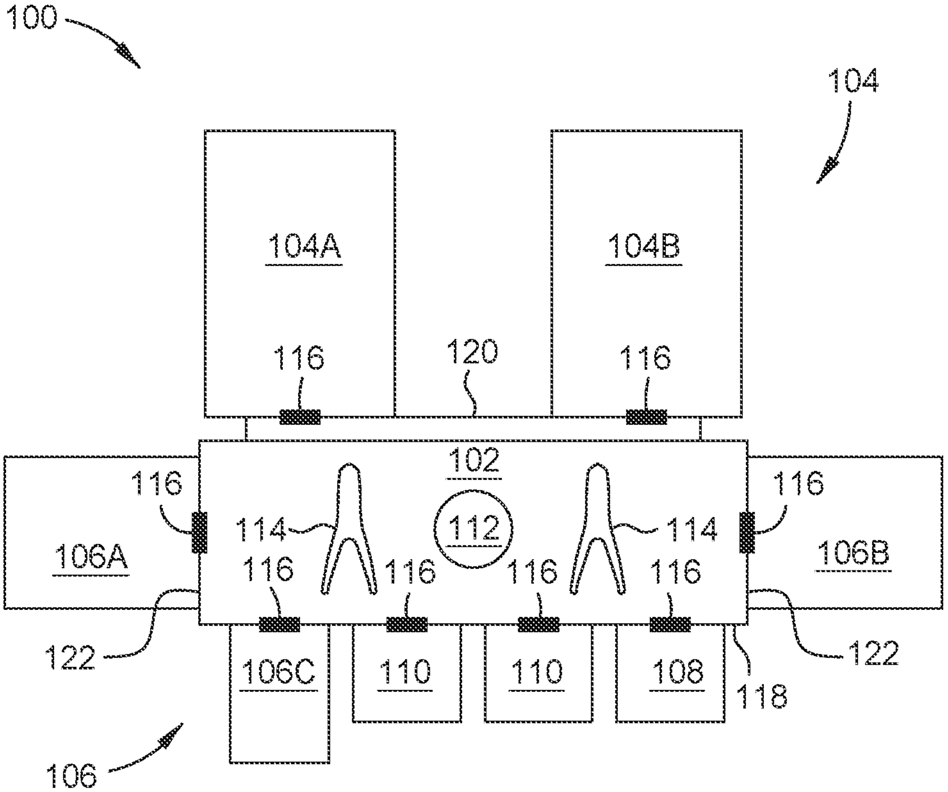
FIG. 1 is a schematic partial top view of an inkjet printing platform, according to one or more embodiments.

FIG. 1 is a schematic partial top view of an inkjet printing platform 100, according to one or more embodiments. The present disclosure contemplates that inkjet printing platforms other than the inkjet printing platform 100 can be used. As an example, inkjet printing platforms can omit certain features shown in FIG. 1 and/or can include certain features not shown in FIG. 1.

The inkjet printing platform 100 is part of a system for processing substrates. The inkjet printing platform 100 includes a transfer chamber 102, one or more inkjet chambers 104 (e.g., two inkjet chambers 104A, 104B are shown), a plurality of auxiliary modules 106 (e.g., three auxiliary modules 106A-106C are shown), a substrate flipper 108, and load ports 110. The transfer chamber 102 includes a pre-aligner 112 and two transfer robots 114 disposed therein. The transfer robots 114 are operable to transfer one or more substrates from the load ports 110 and between the plurality of auxiliary modules 106, the substrate flipper 108, the pre-aligner 112, and the inkjet chambers 104. The inkjet printing platform 100 is operable to process a substrate to form an optical film and/or an optical device. In one embodiment, which can be combined with other embodiments, the substrate is an optical device substrate. The processing of the substrate may include an inkjet printing operation. The substrate is any suitable substrate on which an optical device or optical device film may be formed. In embodiment, which can be combined with other embodiments, the substrate includes, but is not limited to, silicon (Si), silicon nitride (SiN), silicon dioxide ($SiO_2$), fused silica, quartz, silicon carbide (SiC), germanium (Ge), silicon germanium (SiGe), indium phosphide (InP), gallium arsenide (GaAs), gallium oxide (GaO), diamond, lithium niobate ($LiNbO_3$), gallium nitride (GaN), sapphire, tantalum oxide ($Ta_2O_5$), titanium dioxide ($TiO_2$), or any combination(s) thereof. The substrate may have a diameter in a range from about 100 mm to about 750 mm. In one embodiment, which can be combined with other embodiments, the substrate has a surface area of about 1,000 $cm^2$ or more. In embodiment, which can be combined with other embodiments, the surface area of the substrates may be about 2,000 $cm^2$ or more, such as about 4,000 $cm^2$ or more.

The inkjet printing operation conducted in the inkjet printing platform 100 assists in the fabrication of at least one optical device or an optical film. It is to be understood that the at least one optical device described herein is an exemplary optical device and other optical devices may be used with or modified to accomplish aspects of the present disclosure. In one embodiment, which can be combined with other embodiments, the optical device is a waveguide combiner. The waveguide combiner may be utilized for virtual, augmented, or mixed reality. In one embodiment, which can be combined with other embodiments, the optical device is a micro-lens array. In one embodiment, which can be combined with other embodiments, the optical device is utilized for prescription glasses. In one embodiment, which can be combined with other embodiments, the optical device is a flat optical device, such as a metasurface.

Prior to printing, the substrates are removed from the at least one load port 110 by one of the transfer robots 114 and transferred to the transfer chamber 102. The load ports 110 are formed in a first portion 118 of the transfer chamber 102. Upon completion of printing in the inkjet printing platform 100, the printed substrates may be returned to the respective load ports 110 from which the substrates were initially removed. The load ports 110 are configured to automatically load and unload the substrates. The substrates can be accessed by the transfer robots 114 through a slit valve 116 formed between the load ports 110 and the transfer chamber 102. The transfer robots 114 are configured to handle edges of a backside surface of the substrate to avoid backside surface contamination.

Prior to printing, the transfer robot 114 places the substrate on the pre-aligner 112. The pre-aligner 112 may be positioned in the transfer chamber 102. The pre-aligner 112 is operable to at least one of: read an identification of a substrate and/or detect an orientation of the substrate. The pre-aligner 112 is configured to align the substrate in a desired rotational orientation and/or a desired lateral orientation within the inkjet printing platform 100 based on the identification and the orientation of the substrate. In one embodiment, which can be combined with other embodiments, the pre-aligner 112 includes a heat source, such as lamps or infrared generating radiant heaters, adapted to heat the substrate to a desired temperature. The pre-aligner 112 can further be pressurized under a vacuum condition to ensure that any undesirable water or other contamination is removed from the surface of the substrate prior to processing.

The transfer robots 114 are operable to position the substrate in one of a plurality of auxiliary modules 106. For example, as shown in FIG. 1, the inkjet printing platform 100 includes a first auxiliary module 106A, a second auxiliary module 106B, and a third auxiliary module 106C. The plurality of auxiliary modules 106 are coupled to at least one of side portions 122, the first portion 118 or a second portion 120 of the transfer chamber 102. For example, as shown in FIG. 1, the first auxiliary module 106A is coupled to the side portion 122, the second auxiliary module 106B is coupled to the first portion 118, and the third auxiliary module 106C is coupled to the first portion 118. The plurality of auxiliary modules are coupled to the transfer chamber 102 via a plurality of slit valves 116. The transfer robots 114 place the substrates into the auxiliary modules 106A-106C via the slit valves 116. The plurality of auxiliary modules 106 can be selectively isolated from the transfer chamber 102 by use of the slit valves 116 that are disposed between each of the plurality of auxiliary modules 106 and the transfer chamber 102. The first auxiliary module 106A is at least one of an activation module (such as a plasma module), film formation module, oxidation module, reaction module, lithography module, baking module, chilling module, ultraviolet (UV) curing module, thermal curing module, and/or imprinting module. The second auxiliary module 106B is at least one of an activation module (such as a plasma module), film formation module, oxidation module, reaction module, lithography module, baking module, chilling module, ultraviolet (UV) curing module, thermal curing module, and/or imprinting module. The third auxiliary module 106C is at least one of an activation module (such as a plasma module), film formation module, oxidation module, reaction module, lithography module, baking module, chilling module, ultraviolet (UV) curing module, thermal curing module, and/or imprinting module. The substrate may be transferred to one of the plurality of auxiliary modules 106 prior to the inkjet printing operation or after the inkjet printing operation performed in the inkjet chamber(s) 104. Although the three auxiliary modules 106A-106C are shown in FIG. 1, the inkjet printing platform 100 is not limited in the number of auxiliary modules included. For example, one or more (such as one, or four or more) auxiliary modules 106 may be coupled to the transfer chamber 102.

The transfer robots 114 are operable to position the substrate in one of the inkjet chambers 104. For example, as shown in FIG. 1, the inkjet printing platform 100 includes the first inkjet chamber 104A and the second inkjet chamber 104B. The inkjet chambers 104 may be coupled to the second portion 120 of the transfer chamber 102 opposing the third auxiliary module 106C, the load ports 110, and the substrate flipper 108. The inkjet chambers 104 are operable to perform an inkjet printing operation on the substrate. The inkjet printing operation facilitates selective coating of the substrate with an inkjet material to avoid contamination in sensitive areas of the substrate. The thickness and/or height of the inkjet material on the substrate may be modulated with the inkjet printing operation to form a thickness profile and/or a height profile. Additionally, the inkjet printing operation can minimize material usage when forming the optical films or the substrates. In one embodiments, which can be combined with other embodiments, the inkjet printing operation, in combination with a subsequent film formation operation performed in one of the plurality of auxiliary modules 106, may form a plurality of optical device structures on the substrate. The optical device structures may be nanostructures having sub-micron dimensions, e.g., nano-sized dimensions. In one embodiment, which can be combined with other embodiments, one or more of the plurality of auxiliary modules 106 is an activation module (such as an oxidation module) configured to conduct an activation operation on the substrates prior to the inkjet printing operation.

The first inkjet chamber 104A and the second inkjet chamber 104B are coupled to the transfer chamber 102 via a set of the plurality of slit valves 116. The transfer robots 114 place the substrates into the first inkjet chamber 104A and the second inkjet chamber 104B through the slit valves 116. The plurality of slit valves 116 provide an opening for a portion of the transfer robot 114 to enter into the inkjet chambers 104 to place the substrate on a stage (shown in FIG. 3). The first inkjet chamber 104A and the second inkjet chamber 104B can be selectively isolated from the transfer chamber 102 by use of the slit valves 116 that are disposed between each of the first inkjet chamber 104A and the transfer chamber 102, as well as the second inkjet chamber 104B and the transfer chamber 102. The first inkjet chamber 104A and the second inkjet chamber 104B can further be pressurized under a vacuum condition when the slit valve 116 is closed to ensure that any undesirable water or other contamination is removed from the surface of the substrate during the inkjet printing operation. Each of the first inkjet chamber 104A and the second inkjet chamber 104B may be different than the other inkjet chamber. For example, the first inkjet chamber 104A may be configured to deposit a different inkjet material than the second inkjet chamber 104B. Although two inkjet chambers 104 are shown in FIG. 1, the inkjet printing platform 100 is not limited in the number of inkjet chambers 104. For example, one or more (such as one, or four or more) inkjet chambers 104 may be coupled to the transfer chamber 102.

After the inkjet printing operation is performed in the at least one inkjet chamber 104, the transfer robots 114 are operable to position the substrate in the substrate flipper 108. The substrate flipper 108 may be coupled to the first portion 118 of the transfer chamber 102. The substrate flipper 108 is coupled to the transfer chamber 102 via a slit valve 116. The substrate flipper 108 flips the substrate such that a backside surface of the substrate is facing upwards. The substrate may be removed from the substrate flipper 108 and positioned in one of the plurality of auxiliary modules 106 and/or one of the inkjet chambers 104. The substrate flipper 108 allows for double-side processing of the substrate. The capability of double-side processing allows the inkjet printing platform 100 to form functional optical films or optical devices on both surfaces of the substrate, which largely expands the design space and functionality of the substrate.

Figure 2:
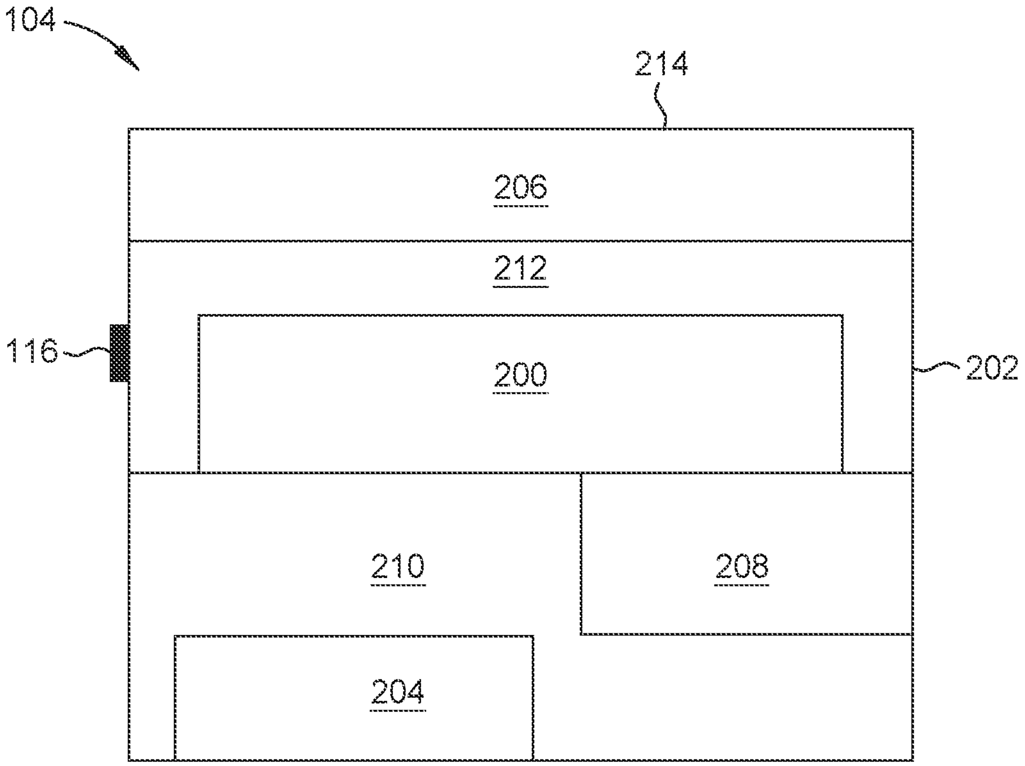
FIG. 2 is a schematic partial side-view of an inkjet chamber, according to one or more embodiments.

FIG. 2 is a schematic partial side-view of an inkjet chamber 104, according to one or more embodiments. The present disclosure contemplates that inkjet chambers other than the inkjet chamber 104 can be used. As an example, inkjet chambers can omit certain features shown in FIG. 2 and/or can include certain features not shown in FIG. 2.

The inkjet chamber 104 may correspond to the first inkjet chamber 104A and/or the second inkjet chamber 104B shown in FIG. 1. The inkjet chamber 104 is included in the inkjet printing platform 100. The inkjet chamber 104 includes an enclosure 202. The enclosure 202 encloses an inkjet printer 200, a fluid supply manifold 204, a fan filter unit 206, and an exhaust port 208 within the inkjet chamber 104. The inkjet printer 200 and the fan filter unit 206 are disposed in a processing region 212 of the inkjet chamber. An inkjet printing operation is performed with the inkjet printer 200 within the processing region 212. The exhaust port 208 and the fluid supply manifold 204 are disposed in a lower region 210 of the inkjet chamber 104. The lower region 210 is disposed below the processing region 212. The enclosure 202 includes a slit valve 116 therethrough such that a transfer robot 114 (shown in FIG. 1) may position the substrate in the processing region 212.

The fluid supply manifold 204 is disposed in the lower region 210. The fluid supply manifold 204 may include a plurality of supply fluids. For example, the fluid supply manifold 204 may include maintenance fluids utilized for maintenance of the inkjet chamber 104. The fluid supply manifold 204 may also include material sources, such as inkjet materials, utilized in the inkjet printing operation. The fluid supply manifold 204 may be fluidly coupled to the inkjet printer 200.

The exhaust port 208 is disposed in the lower region 210. The exhaust port 208 is fluidly coupled to the processing region 212. The exhaust port 208 is operable to remove contaminants from the processing region 212 that are produced during processing. In one embodiment, which can be combined with other embodiments, contaminants such as volatile organic compounds (VOCs) generated by the inkjet material and/or maintenance materials are removed via the exhaust port 208. The processing region 212 can be maintained at a negative pressure to facilitate avoiding the contaminants leaking outside of the inkjet chamber 104.

The fan filter unit 206 is disposed in the processing region 212. The fan filter unit 206 is coupled to a top surface 214 of the enclosure 202. The fan filter unit 206 is operable to create a vertical flow of clean, dry air through the processing region 212. The fan filter unit 206 can maintain the processing region 212 at a positive pressure to facilitate minimizing air and particle intake from outside the inkjet chamber 104. The fan filter unit 206 and the exhaust port 208 can provide independent pressure control in the processing region 212. The fan filter unit 206 and the exhaust port 208 can provide for control of the processing region 212. The control of the processing region 212 facilitates ensuring process quality and consistency when processing the substrates.

Figure 3:
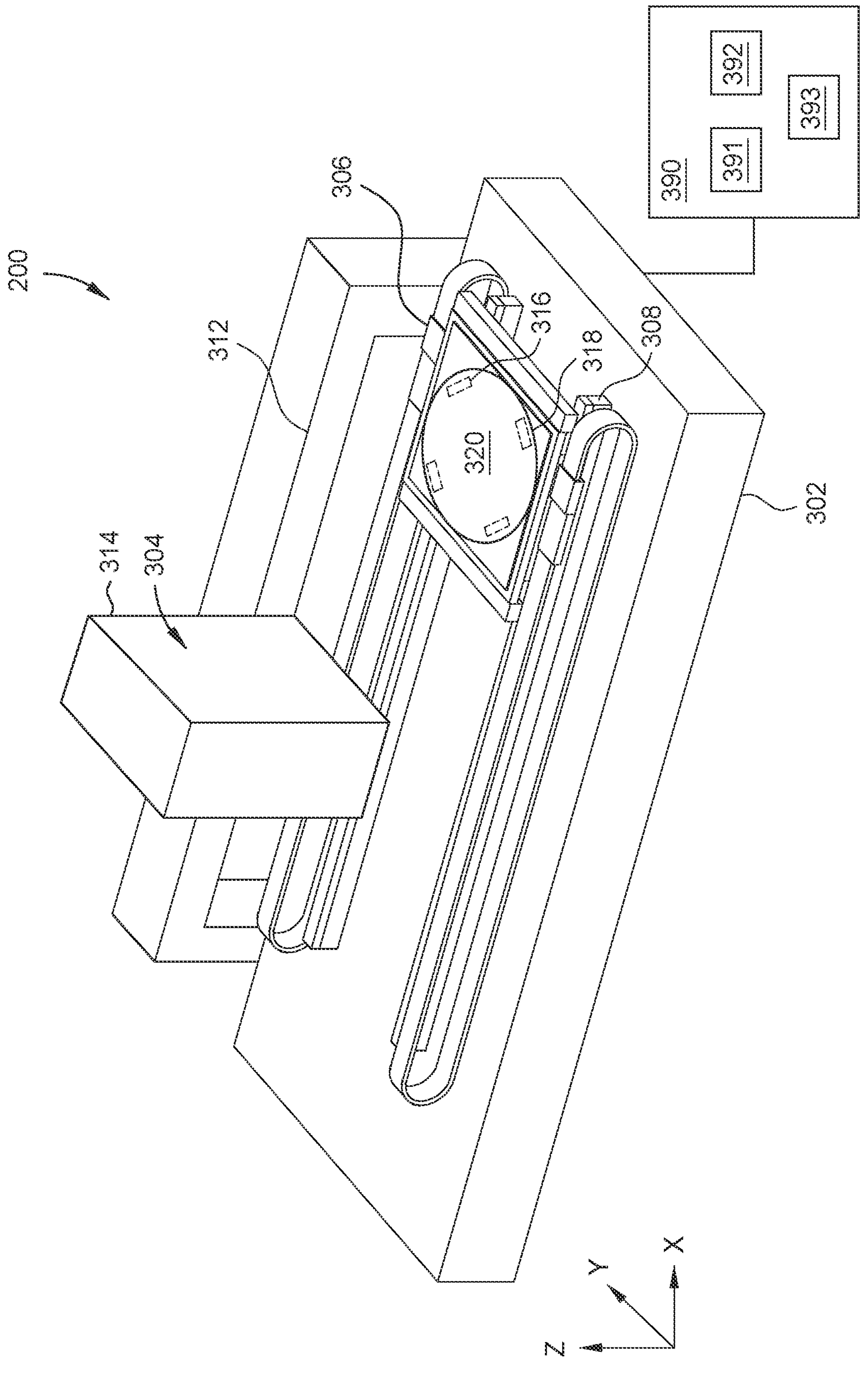
FIG. 3 is a schematic partial perspective view of an inkjet printer, according to one or more embodiments.

FIG. 3 is a schematic partial perspective view of an inkjet printer 200, according to one or more embodiments. The present disclosure contemplates that inkjet printers other than the inkjet printer 200 can be used. As an example, inkjet printers can omit certain features shown in FIG. 3 and/or can include certain features not shown in FIG. 3.

The inkjet printer 200 is disposed in a processing region 212 (shown in FIG. 2) of an inkjet chamber 104 (shown in FIG. 2). The inkjet printer 200 includes a stage 306 and a processing apparatus 304. The stage 306 is supported by a pair of tracks 308 disposed on a slab 302. A substrate 320 is supported by the stage 306. The stage 306 moves along the pair of tracks 308 in at least one of an X direction, a Y direction, and/or a Z direction, as indicated by the coordinate system shown in FIG. 3. In one embodiment, which can be combined with other embodiments, the pair of tracks 308 is a pair of parallel magnetic channels. As shown, each track 308 of the pair of tracks 308 is linear. The pair of tracks 308 may have a non-linear shape. In one embodiment, which can be combined with other embodiments, an encoder is coupled to the stage 306 in order to provide information of the location of the stage 306 to a controller 390. The controller 390 is generally designed to facilitate the control and automation of the inkjet printing operation described herein, along with other operations. The controller 390 may be communicatively coupled to the processing apparatus 304, the stage 306, and the encoder.

The processing apparatus 304 is coupled to a support 312. The processing apparatus 304 is disposed over the pair of tracks 308. The pair of tracks 308 and the stage 306 are operable to pass under the processing apparatus 304. The processing apparatus 304 is supported over the slab 302 by the support 312. The processing apparatus 304 includes a case 314. The processing apparatus 304 is operable to distribute one or more inkjet materials onto the substrate 320. The substrate 320 is positioned on the stage 306 via one of the transfer robots 114 (shown in FIG. 1). The stage 306 may include vacuum slots 316 to retain the substrate 320. The vacuum slots 316 are between 1 millimeter and 5 millimeters from an edge 318 of the substrate 320. In one embodiment, which can be combined with other embodiments, the vacuum slots 316 are elevated from the surface of the stage 306. The vacuum slots 316 retain the substrate 320 while minimizing contact to a backside surface of the substrate 320 and contamination of the substrate 320.

The implementations described herein include the controller 390 configured to control various features to conduct the operations described herein. The controller 390 includes a central processing unit (CPU) 391, a memory 392 containing instructions, and support circuits 393 for the CPU 391. The controller 390 controls the various items directly, or via other computers and/or controllers. In embodiment, which can be combined with other embodiments, the controller 390 is communicatively coupled to dedicated controllers, and the controller 390 functions as a central controller.

The controller 390 is of any form of a general-purpose computer processor that is used in an industrial setting for controlling various substrate processing chambers and equipment, and sub-processors thereon or therein. The memory 392, or non-transitory computer readable medium, is one or more of a readily available memory such as random access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)), read only memory (ROM), floppy disk, hard disk, flash drive, or any other form of digital storage, local or remote. The support circuits 393 are coupled to the CPU 391 for supporting the CPU 391 (a processor). The support circuits 393 include cache, power supplies, clock circuits, input/output circuitry and subsystems, and the like. Operational parameters (such as a reaction temperature) and operations are stored in the memory 392 as a software routine that is executed or invoked to turn the controller 390 into a specific purpose controller to control the operations of the various chambers/modules described herein. The controller 390 is configured to conduct any of the operations described herein. The instructions stored on the memory 192, when executed, cause one or more of operations 502-510 of method 500 (described below) to be conducted.

The various operations described herein (such as the operations 502-510 of the method 500) can be conducted automatically using the controller 390, or can be conducted automatically or manually with certain operations conducted by a user.

The controller 390 is communicatively coupled to: an inkjet chamber configured to conduct a printing operation, a stage positioned in the inkjet chamber, an inkjet printer head positioned in the inkjet chamber, an activation chamber configured to conduct an activation operation, a curing chamber configured to conduct a curing operation, a reaction chamber configured to allow the reaction to occur at the reaction temperature, and/or a film formation chamber configured to conduct a film formation operation. The controller 390 can be disposed within the one or more inkjet chambers 104A, 104B or externally to the one or more inkjet chambers 104A, 104B.

Figure 4:
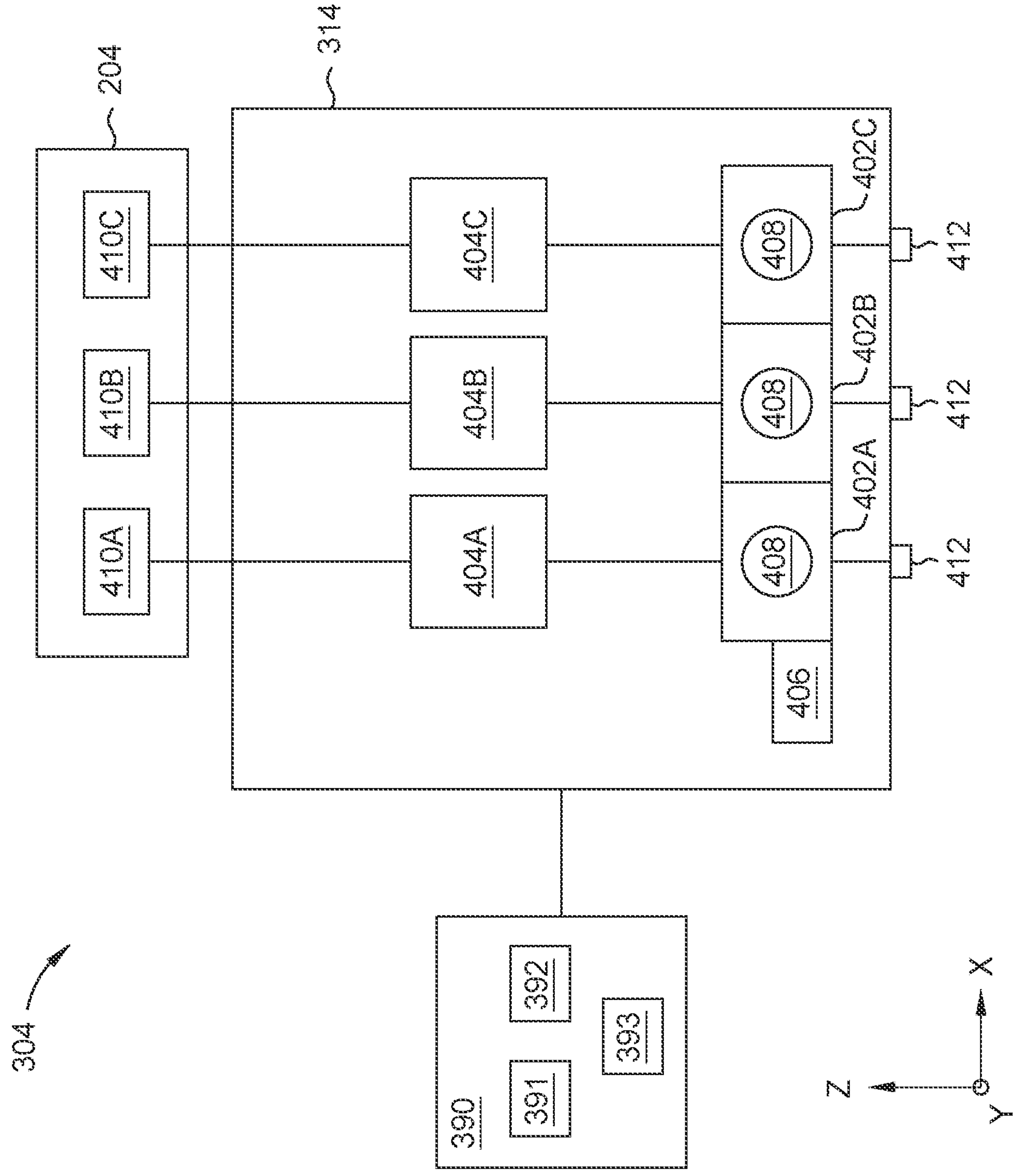
FIG. 4 is a schematic partial side-view of a processing apparatus, according to one or more embodiments.

FIG. 4 is a schematic side-view of a processing apparatus 304, according to one or more embodiments. The present disclosure contemplates that processing apparatus other than the processing apparatus 304 can be used. As an example, processing apparatus 304 can omit certain features shown in FIG. 4 and/or can include certain features not shown in FIG. 4.

The processing apparatus 304 may be disposed in an inkjet printer 200 (shown in FIG. 2). The processing apparatus 304 is operable to distribute one or more inkjet materials onto the substrate 320 (shown in FIG. 3). The processing apparatus 304 includes a plurality of printheads 402A-402C, a plurality of ink recirculation modules 404A-404C, at least one alignment camera 406, and a plurality of alignment mechanisms 408. The plurality of printheads 402A-402C, the plurality of ink recirculation modules 404A-404C, the at least one alignment camera 406, and the plurality of alignment mechanisms 408 are disposed in a case 314 of the processing apparatus 304.

The processing apparatus 304 may include one or more printheads 402A-402C. For example, as shown in FIG. 4, the processing apparatus 304 includes a first printhead 402A, a second printhead 402B, and a third printhead 402C. Although only three of the plurality of printheads 402A-402C are shown in FIG. 4, the processing apparatus 304 is not limited in the number of printheads 402A-402C included in the case 314. For example, one or more printheads 402A-402C may be included in the case 314. In one embodiment, which can be combined with other embodiments, a first inkjet chamber 104A (shown in FIG. 1) includes three printheads 402A-402C and a second inkjet chamber 104B (shown in FIG. 1) includes four printheads. In one embodiment, which can be combined with other embodiments, the first inkjet chamber 104A (shown in FIG. 1) and the second inkjet chamber 104B (shown in FIG. 1) include the same number of printheads 402A-402C in the processing apparatus 304.

A fluid supply manifold 204 disposed in the inkjet chamber 104 includes one or more inkjet material sources 410A-410C. Each inkjet material source 410A-410C is fluidly coupled to one of the plurality of printheads 402A-402C. For example, a first inkjet material source 410A is coupled to the first printhead 402A, a second inkjet material source 410B is coupled to the second printhead 402B, and a third inkjet material source 410C is coupled to the third printhead 402C. In one embodiment, which can be combined with other embodiments, each inkjet material source 410A-410C may be loaded with different inkjet materials. In one embodiment, which can be combined with other embodiments, the same inkjet material may be loaded into at least two inkjet material sources 410A-410C. In one embodiment, which can be combined with other embodiments, each of the inkjet material sources 410A-410C includes a different inkjet material. Including the same inkjet material in multiple inkjet material sources 410A-410C facilitates improving throughput and the print resolution of the inkjet printing operation. Including multiple inkjet materials in each inkjet chamber 104 facilitates increasing the array of inkjet materials that may be deposited in the inkjet operation. For example, each inkjet material may have different material properties, such as viscosity, to tune the optical film or the optical device to be formed by the inkjet printing operation. The multiple inkjet materials further enables different materials to physically and/or chemically interact with each other on the substrate to create films and structures that require multiple inkjet materials, thus increasing the variety of optical films and optical devices formed.

As shown in FIG. 1, the first inkjet chamber 104A and the second inkjet chamber 104B are coupled to the transfer chamber 102. The first inkjet chamber 104A and the second inkjet chamber 104B each include a processing apparatus 304 with the one or more printheads 402A-402C. The configuration of the inkjet printing platform 100 facilitates improving the possible spectrum of optical films and optical devices that are produced in the inkjet printing platform 100 with increased quality. The quality of the optical films, optical device structures, and/or optical devices improves because a wide array of inkjet materials are able to be deposited within the inkjet printing platform 100. Therefore, the optical films, optical device structures, and/or optical devices to be formed remain in the environment of the inkjet printing platform 100 to avoid contamination. The possible spectrum of optical films and optical devices that are produced in the inkjet printing platform 100 is increased due to the first inkjet chamber 104A including a first set of one or more printheads 402A-402C configured to deposit an inkjet material with a first viscosity range and the second inkjet chamber 104B including a second set of one or more printheads 402A-402C configured to deposit an inkjet material with a second viscosity range. The first viscosity range is different from the second viscosity range. Examples of the inkjet materials include, but are not limited to, acrylate, oil, aqueous, and/or solvent based formulations.

In embodiment, which can be combined with other embodiments, the one or more printheads 402A-402C in the first inkjet chamber 104A are configured to deposit different inkjet materials than the one or more printheads 402A-402C in the second inkjet chamber 104B. For example, the first inkjet chamber 104A can include thermal printheads and the second inkjet chamber 104B can include piezo printheads. Each different type of printhead is operable to deposit inkjet materials of different physical and chemical properties. In such an example, the viscosity of the inkjet materials to be deposited in the first inkjet chamber 104A is different than the viscosity of the inkjet material in the second inkjet chamber 104B. In one embodiment, which can be combined with other embodiments, aqueous inks may be deposited in the first inkjet chamber 104A and oil-based inks can be deposited in the second inkjet chamber 104B. Further, as each of the processing apparatus 304 in the first inkjet chamber 104A and the second inkjet chamber 104B can deposit multiple different inkjet materials, the range of inkjet materials that may be deposited in the inkjet printing platform increases. Each printhead 402A-402C can deposit a different inkjet material. For example, the first inkjet chamber 104A may deposit two or more different aqueous inkjet materials and the second inkjet chamber 104B may deposit two or more different oil-based inkjet materials.

Each of the one or more printheads 402A-402C includes a nozzle 412. Additionally, the nozzle 412 of each of the one or more printheads 402A-402C may be different. For example, a nozzle size of the nozzles 412 of each of the one or more printheads 402A-402C further allows for a range of inkjet materials to be deposited. The nozzle of each of the printheads 402A-402C in the first inkjet chamber 104A and the second inkjet chamber 104B can be chosen specifically based on the physical and chemical properties of the inkjet materials to be deposited. Therefore, inkjet materials with different physical and chemical properties can be deposited in the first inkjet chamber 104A and the second inkjet chamber 104B, respectively. The nozzle sizes of the nozzles 412 can be the same.

The first inkjet chamber 104A and the second inkjet chamber 104B can be configured to deposit inkjet materials having physical and chemical properties that are not compatible within the same processing apparatus 304. Further, the first inkjet chamber 104A and the second inkjet chamber 104B are in communication via the transfer chamber 102. As such, the inkjet printing platform 100 is configured such that different inkjet materials may physically and/or chemically interact with each other on the substrate 320 to create optical films, optical device structures, and/or optical devices without leaving the environment of the inkjet printing platform. Therefore, the formation of optical films, optical device structures, and/or optical devices that otherwise are difficult to form with a homogeneous ink composition may be formed. The first inkjet chamber 104A includes one or more printheads 402A-402C configured to deposit an inkjet material with the first viscosity range and the second inkjet chamber 104B includes one or more printheads 402A-402C configured to deposit an inkjet material with the second viscosity range. The first viscosity range is different than the second viscosity range. For example, the first viscosity range is an aqueous inkjet material and the second viscosity range is an oil-based inkjet material.

Each of the plurality of printheads 402A-402C are coupled to one of the alignment mechanisms 408. The alignment mechanisms 408 align each of the plurality of printheads 402A-402C to each other. The plurality of printheads 402A-402C are aligned with a translational offset less than about 5 μm. The plurality of printheads 402A-402C are aligned within a rotational offset less than about 5 arcmin. Each of the plurality of printheads 402A-402C can be moved in at least the X direction, the Y direction, and/or the Z direction. In one embodiment, which can be combined with other embodiments, the alignment mechanisms 408 are knobs coupled to the plurality of printheads 402A-402C. The knobs may be adjusted to align the plurality of printheads 402A-402C.

The plurality of ink recirculation modules 404A-404C are disposed in the case 314. The plurality of ink recirculation modules 404A-404C are disposed above the plurality of printheads 402A-402C. Each ink recirculation module 404A-404C is fluidly coupled to one of the plurality of printheads 402A-402C. For example, a first ink recirculation module 404A is coupled to the first printhead 402A, a second ink recirculation module 404B is coupled to the second printhead 402B, and a third ink recirculation module 404C is coupled to the third printhead 402C. The plurality of ink recirculation modules 404A-404C are operable to circulate the inkjet material such that the inkjet material continuously flows through the processing apparatus 304. The continuous flow of the inkjet material improves the deposition of the inkjet material during the inkjet printing operation by reducing inkjet material settlement and clogging in the processing apparatus 304.

The processing apparatus 304 further includes at least one alignment camera 406. The alignment camera 406 is disposed in the case 314. The alignment camera 406 is operable to align the substrate within the inkjet printer 200 (shown in FIG. 2). A transfer robot 114 (shown in FIG. 1) provides the substrate into the inkjet chamber 104 and positions the substrate on a stage 306 (shown in FIG. 3). The at least one alignment camera 406 will derive the spatial coordinates of the substrate to ensure the substrate is aligned with respect to the processing apparatus 304 in the inkjet printer 200 (shown in FIG. 2). The alignment camera 406, in communication with the controller 390, adjusts the stage 306 to align the substrate 320 relative to the nozzles 412. The alignment camera 406 is operable to move in the Z direction to focus on the substrate. The substrate 320 may be aligned when the backside surface of the substrate is facing upward.

Figure 5:
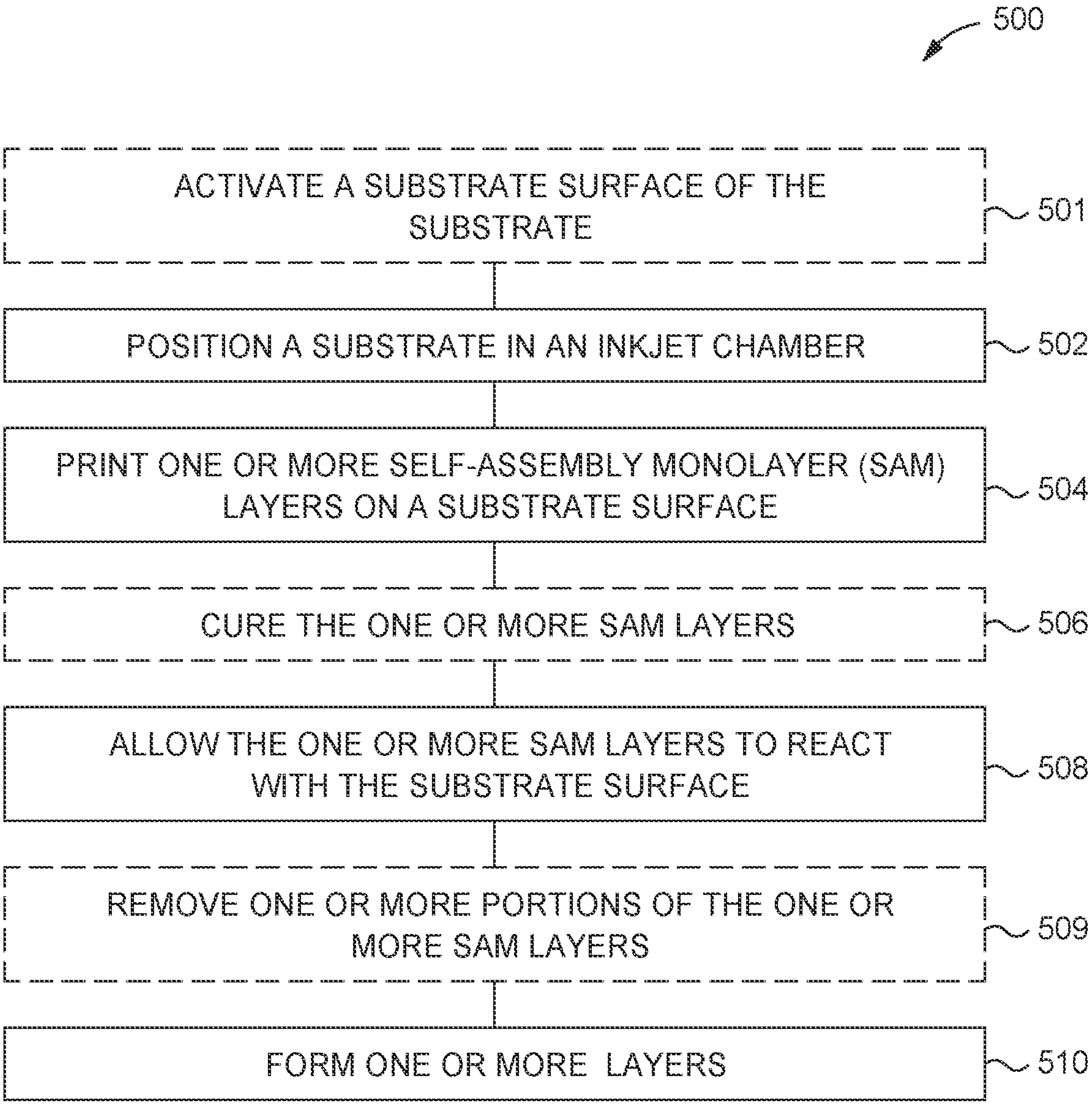
FIG. 5 is a schematic flowchart of a method of forming a self-assembled monolayer (SAM) structure, according to one or more embodiments.

FIG. 5 is a schematic flowchart of a method 500 of forming a self-assembled monolayer (SAM) structure, according to one or more embodiments.

Optional operation 501 includes activating a substrate surface of the substrate. In one embodiment, which can be combined with other embodiments, the substrate surface is exposed to one or more of a plasma, ultraviolet (UV) light, and/or ozone (03) to activate the substrate surface 600. In one embodiment, which can be combined with other embodiments, the substrate surface 600 is exposed to UV light and ozone. In embodiment, which can be combined with other embodiments, substrate surface is exposed to plasma, and the plasma is an oxygen plasma.

In one embodiment, which can be combined with other embodiments, the activation oxidizes the substrate surface 600. In embodiment, which can be combined with other embodiments, the activation forms active silanol in the substrate surface. In embodiment, which can be combined with other embodiments, the substrate is activated in a chamber (such as an auxiliary chamber, for example a plasma chamber) that is different than the inkjet chamber referenced in operation 502. The present disclosure also contemplates that the substrate can be activated in the inkjet chamber, and operation 501 can be conducted after operation 502.

Operation 502 includes positioning a substrate in an inkjet chamber. The substrate can be positioned on a stage. The positioning can include causing relative movement between the stage and a processing apparatus that includes one or more inkjet nozzles. The relative movement can be cause by moving one or both of the stage and/or the processing apparatus. The positioning can align the substrate relative to the one or more inkjet nozzles.

Operation 504 includes printing one or more SAM layers on a substrate surface of the substrate in a localized manner such that a portion of the substrate surface is left exposed to a processing region of the inkjet chamber. In one embodiment, which can be combined with other embodiments, the one or more SAM layers include a plurality of SAM layers printed in a spatial manner such that a first SAM layer is spaced from a second SAM layer. The printing includes spraying one or more subsections of the substrate surface with an ink that includes a SAM composition. The SAM composition includes an active component and a hydrophobic tail. The spatial manner leaves a portion of the substrate surface exposed to a processing region of the inkjet chamber. The processing region can be at least part of an internal volume of the inkjet chamber. In embodiment, which can be combined with other embodiments, the exposing of operation 501 occurs prior to the printing of operation 504.

The active component includes one or more of silane, thiol (—SH), amine (—$NH_2$), acid (—COOH), and/or alcohol (—OH). In one embodiment, which can be combined with other embodiments, the silane includes one or more of —$SiCl_3$, —$SiBr_3$, —$SiMe_2Cl$, —$SiMe_2Br$, —$Si(OMe)_3$, —$Si(OEt)_3$, —$SiH_3$, and/or —$SiMe_2H$. In one embodiment, which can be combined with other embodiments, the silane includes one or more of trichlorosilane ($HCl_3Si$), trimethoxysilane ($(CH_3O)_3SiH$), triethoxysilane ($HSi(OC_2H_5)_3$), and/or dichloromethylsilane ($CH_3SiHCl_2$). Other materials are contemplated for the silane. The hydrophobic tail includes one or more of: one or more C1-C20 Alkanes, a copolymer, polyethylene glycol (PEG), polydimethylsiloxane (PDMS), polypropylene glycol (PPG), polyacrylate, one or more polymethacrylates, polystyrene, and/or one or more derivatives thereof. In one embodiment, which can be combined with other embodiments, the one or more C1-C20 Alkanes are perfluorinated or partially fluorinated, or non-fluorinated. The back bond of the Alkanes can be linear or branched. Other organic functionalities can be included for the hydrophobic tail, such as one or more of an ether, an ester, an amide, a ketone, a vinyl, an alkynyl, a carbonate, and/or a urethane.

In one embodiment, which can be combined with other embodiments, the SAM composition includes one or more of a polymer and/or an oligomer, in addition to the active component and the hydrophobic tail. The polymer includes one or more of a copolymer, perfluoropolyether (PFPE), polyethylene glycol (PEG), polydimethylsiloxane (PDMS), polypropylene glycol (PPG), polyacrylate, one or more polymethacrylates, polystyrene, and/or one or more derivatives thereof.

In one embodiment, which can be combined with other embodiments, the SAM composition includes one or more of a solvent and/or an additive, in addition to the active component and the hydrophobic tail. The solvent includes one or more of an organic alkane, an alkene, alcohol, an ester, an ether, a carbonate, and/or a fluorinated solvent. The additive includes one or more of: one or more amphiphilic materials, one or more copolymers, and/or one or more charged molecules. The fluorinated solvent includes one or more of 3M™ Fluorinert™ electronic liquid FC-40, 3M™ Novec™ 7200 engineered fluid, an AsahiKlin™ AE-3000 series solvent, AMOLEA™ AT2, NEXT 3000, and/or EnSolv® NEXT. Other fluorinated solvent(s) are contemplated for the solvent.

Optional operation 506 includes curing the one or more SAM layers prior to the allowing of the one or more SAM layers to react with the substrate surface (of operation 508). The curing includes ultraviolet (UV) curing and/or thermal curing. In one embodiment, which can be combined with other embodiments, the curing cures the polymer of the one or more SAM layers. In embodiment, which can be combined with other embodiments, the curing occurs after all of the one or more SAM layers are printed. In embodiment, which can be combined with other embodiments, the one or more SAM layers are cured in a chamber (such as an auxiliary chamber, for example a curing chamber) that is different than the inkjet chamber referenced in operation 502 after transferring the substrate out of the inkjet chamber. The present disclosure also contemplates that the substrate can be cured in the inkjet chamber.

Operation 508 includes allowing the one or more SAM layers to react with the substrate surface. The SAM composition of the one or more SAM layers reacts with the silanol of the substrate surface to form siloxane. The one or more SAM layers are allowed to react with the substrate surface at a reaction temperature and for a reaction time. The reaction temperature is within a range of an ambient temperature (such as room temperature) to 200 degrees Celsius. The reaction time is within a range of 1 second to 10 minutes. The polymer has a glass transition temperature (Tg) that is less than the reaction temperature. In embodiment, which can be combined with other embodiments, the one or more SAM layers react with the substrate surface in a chamber (such as an auxiliary chamber, for example a reaction chamber) that is different than the inkjet chamber referenced in operation 502 after transferring the substrate out of the inkjet chamber. The present disclosure also contemplates that the reaction can occur in the inkjet chamber.

The present disclosure contemplates that the activating the substrate surface, the reaction, and/or the curing can take place in the inkjet chambers 104A, 104B, the auxiliary modules 106A-106C, and/or one or more chambers not shown in FIG. 1.

Optional operation 509 includes removing one or more portions of the one or more SAM layers after the allowing of the one or more SAM layers to react with the substrate surface. In one embodiment, which can be combined with other embodiments, the one or more portions are stripped away using a solvent. In embodiment, which can be combined with other embodiments, the solvent is organic or water. The removed one or more portions are upper sections of the one or more SAM layers that include a polymer matrix.

The present disclosure contemplates that the removal of the one or more portions can take place in the inkjet chambers 104A, 104B, the auxiliary modules 106A-106C, and/or one or more chambers not shown in FIG. 1.

Operation 510 includes forming one or more layers over the portion of the substrate surface that is left exposed in operation 504. In one embodiment, which can be combined with other embodiments, the one or more layers are device function layers. In one embodiment, which can be combined with other embodiments, the one or more layers are deposited using atomic layer deposition (ALD), such as area-selective ALD (AS-ALD). The present disclosure contemplates that other formation operations may be used, such as one or more of: epitaxial deposition, multi-beam-epitaxy (MBE), ion-beam-assisted-deposition (IBAD), physical vapor deposition (PVD), chemical vapor deposition (CVD, such as plasma-enhanced CVD or flowable CVD), nanoimprinting lithography, photolithography patterning, a liquid material pour casting process, a spin-on glass, a spin-on coating process, a liquid spray coating process, a dry powder coating process, a screen printing process, and/or a doctor blading process. In one embodiment, which can be combined with other embodiments, the one or more layers include one or more of silicon (Si), phosphorus (P), germanium (Ge), silicon oxide, silicon nitride, silicon oxynitride, metal, metal oxide, metal nitride, metal oxynitride, metal silicide, metal silicate, and/or metal carbide. In embodiment, which can be combined with other embodiments, the metal includes one or more of titanium (Ti), tantalum (Ta), tungsten (W), aluminum (Al), chromium (Cr), and/or hafnium (Hf). Other metals are contemplated.

In one embodiment, which can be combined with other embodiments, the one or more layers are deposited using ALD, and the one or more layers include one or more of metal oxide, metal nitrile, conducting metal, and/or noble metal. The metal oxide includes one or more of aluminum oxide ($Al_2O_3$), silicon dioxide ($SiO_2$), hafnium oxide ($HfO_2$), tantalum pentoxide ($Ta_2O_5$), titanium dioxide ($TiO_2$), zirconium dioxide ($ZrO_2$). The metal nitrile includes one or more silicon nitride ($Si_3N_4$), titanium nitride (TiN), tantalum nitride (TaN), and/or aluminum nitride (AlN). The conducting metal includes one or more of copper (Cu) and/or tungsten (W). The noble metal includes one or more of iridium (Ir), ruthenium (Ru), and/or palladium (Pd). Other materials are contemplated for the metal oxide, the metal nitrile, the conducting metal, and/or the noble metal.

The present disclosure contemplates that the formation of the one or more layers can take place in the auxiliary modules 106A-106C and/or one or more chambers not shown in FIG. 1.

The present disclosure contemplates that the operations of the method 500 can be conducted at least partially simultaneously with each other. As an example, the positioning of operation 502 can be conducted at least partially simultaneously with the printing of operation 504. As an example, the curing of operation 506 can be conducted at least partially simultaneously with the reaction of operation 508.

FIGS. 6A-6D are schematic operation flow side views of a portion of the method 500 shown in FIG. 5, according to one or more embodiments.

Figures 6A, 6B, 6C, 6D:
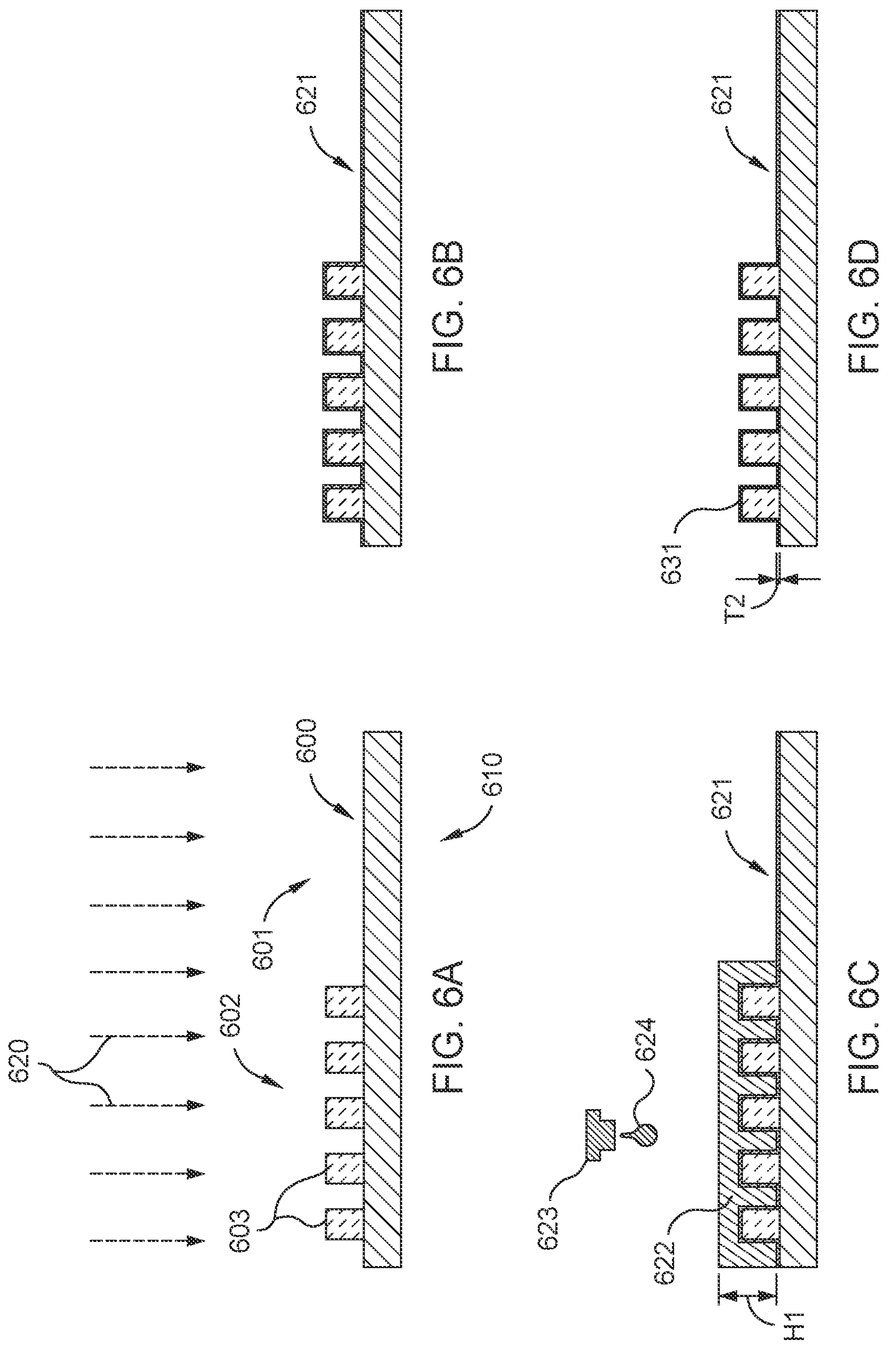
FIGS. 6A-6D are schematic operation flow side views of a portion of the method shown in FIG. 5, according to one or more embodiments.

FIG. 6A shows a substrate 610 having a substrate surface 600. The substrate surface 600 includes a planar portion 601 and a non-planar portion 602. The non-planar portion 602 includes a plurality of nanostructures 603, such as gratings. During the activation operation of operation 501, the substrate surface 600 is exposed to a material 620. The material 620 includes one or more of a plasma, UV light, and/or ozone.

FIG. 6B shows the substrate surface 600 activated into an activated surface 621. In one embodiment, which can be combined with other embodiments, the substrate surface 600 is exposed to one or more of a plasma, ultraviolet (UV) light, and/or ozone ($O_3$) to activate the substrate surface 600. In one embodiment, which can be combined with other embodiments, the substrate surface 600 is exposed to UV light and ozone. In one embodiment, which can be combined with other embodiments, the activation of the substrate surface 600 oxidizes the substrate surface 600. The activation of the substrate surface 600 generates active silanol in the active surface 621.

FIG. 6C shows a SAM layer 622 printed onto the non-planar portion 602 of the activated surface 621. As described herein, the SAM layer 622 can include materials such as one or more polymers and/or additives. The SAM layer 622 is printed to a height H1 that is up to 1.0 micron. The height H1 of the SAM layer 622 exceeds a height of the nanostructures 603 to facilitate a more complete coating of the nanostructures 603 with the SAM layer 602. In embodiment, which can be combined with other embodiments (such as in the implementation shown in FIG. 6C), the SAM layer 622 is printed to the height H1, and the SAM layer 622 has a varying printed thickness due to the nanostructures. The SAM layer 622 is printed by one or more nozzles 623 spraying an ink 624 onto the activated surface 621. The SAM layer 622 reacts with the silanol of the activated surface 621 to form a reacted surface 631 (shown in FIG. 6D) of the SAM layer 622. The reacted surface 631 includes siloxane. In one embodiment, which can be combined with other embodiments, the ink 624 includes a polymer to facilitate reduced or eliminated vaporization and/or contamination of the SAM layer 622 throughout the method 500. The reduced vaporization and contamination facilitate reduced material consumption and enhanced performance.

FIG. 6D shows the reacted surface 631. Upper sections of the SAM layer 622 are removed, leaving the reacted surface 631. The upper sections have excess SAM material. The reacted surface 631 has a thickness T2 within a range of 0.1 nm to 5.0 nm, such as 1.00 nm to 5.0 nm. In one embodiment, which can be combined with other embodiments, the thickness T2 is less than 2.0 nm. In a subsequent film formation operation, one or more layers can be formed over the exposed activated surface 621. The reacted surface 631 having siloxane facilitates reduced or eliminated film formation over the non-planar portion 602.

The reacted surface 631 has a surface energy (such as surface tension) that is lower than a surface energy of the activated surface 621. The reacted surface 631 has a water contact angle that is higher than a water contact angle of the activated surface 621. The reacted surface 631 is hydrophobic and the activated surface 621 is hydrophilic. The lower surface energy facilitates reduced or eliminated film formation over the non-planar portion 602.

FIGS. 7A-7D are schematic operation flow top views of a portion of the method 500 shown in FIG. 5, according to one or more embodiments.

Figure 7A:
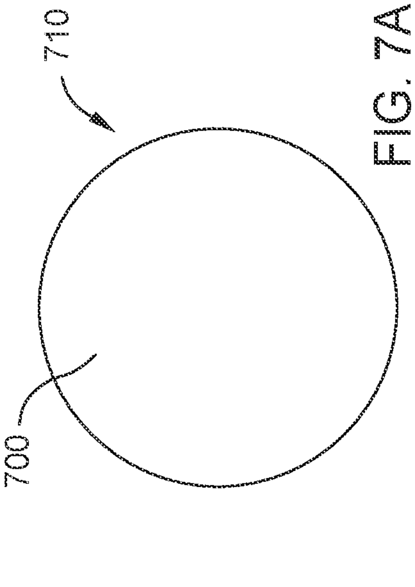
FIGS. 7A-7D are schematic operation flow top views of a portion of the method shown in FIG. 5, according to one or more embodiments.

FIG. 7A shows a bare silicon (Si) substrate 710 having a substrate surface 700. The substrate 710 is planar.

Figure 7B:
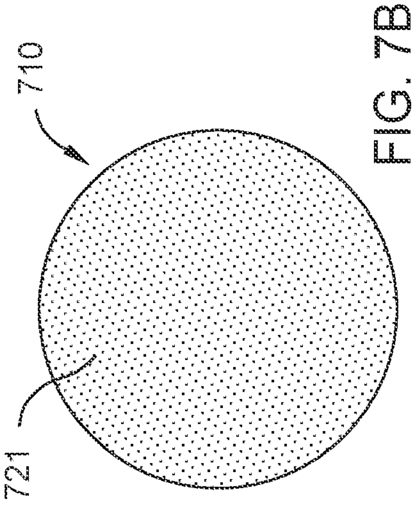

FIG. 7B shows the substrate surface 700 activated into an activated surface 721.

Figure 7C:
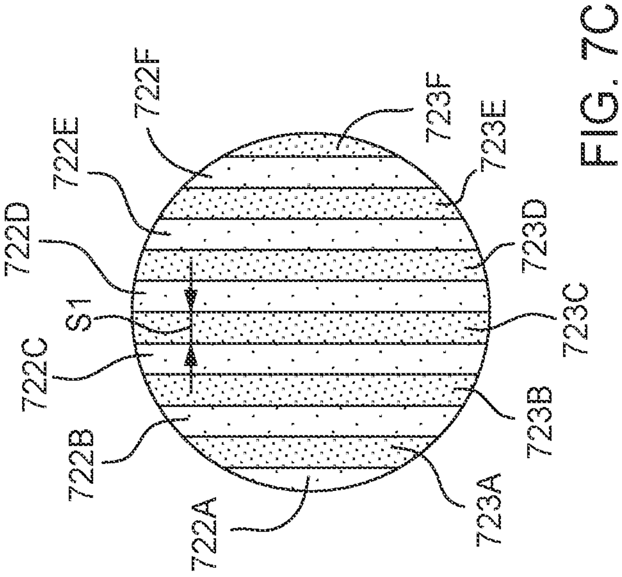

FIG. 7C shows a plurality of SAM layers 722A-722F printed on the substrate surface (which is activated as the activated surface 721) in a spatial manner. The SAM layers 722A-722F are printed in a spatial manner such that a first SAM layer 722C is spaced from a second SAM layer 722D by a spacing 51. FIG. 7C also shows exposed portions 723A-723F of the activated surface 721.

Figure 7D:
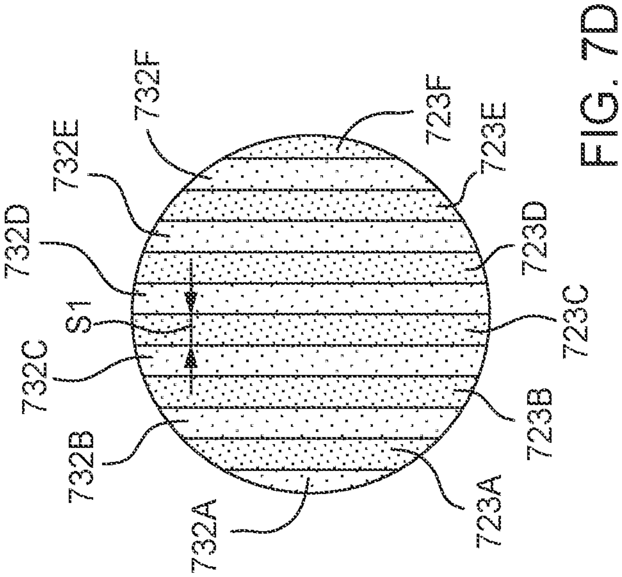

FIG. 7D shows the SAM layers 722A-722F reacted into a plurality of reacted surfaces 732A-732F.

Figure 8A:
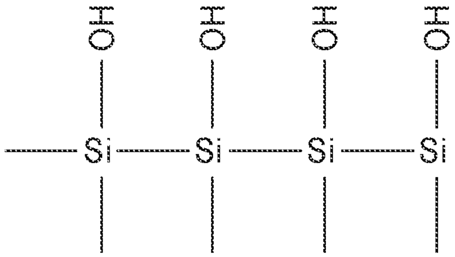
FIG. 8A is a schematic diagram view of a bond structure of the activated surface shown in FIG. 7B, according to one or more embodiments.

FIG. 8A is a schematic diagram view of a bond structure of the activated surface 721 shown in FIG. 7B, according to one or more embodiments. The bond structure shown in FIG. 8A shows silanol.

Figure 8B:
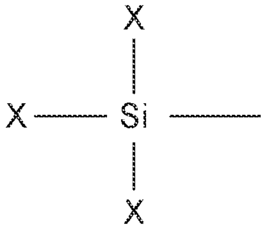
FIG. 8B is a schematic diagram view of a bond structure of the ink shown in FIG. 6C, according to one or more embodiments.

FIG. 8B is a schematic diagram view of a bond structure of the ink 624 shown in FIG. 6C, according to one or more embodiments. In the bond structure, silicon "Si" is bonded with an element of functional group "X." In one embodiment, which can be combined with other embodiments, the element "X" includes one or more of chlorine (Cl), an alkoxy, hydroxide, (OH), and/or methoxy (OMe).

Figure 8C:
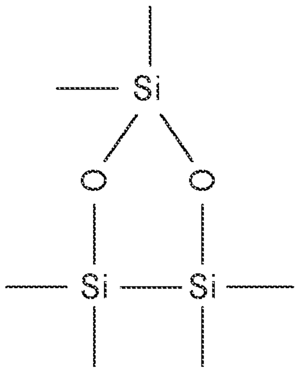
FIG. 8C is a schematic diagram view of a bond structure of the reacted surfaces shown in FIG. 7D, according to one or more embodiments.

FIG. 8C is a schematic diagram view of a bond structure of the reacted surfaces 732A-732F shown in FIG. 7D, according to one or more embodiments. The bond structure shown in FIG. 8C shows siloxane. The present disclosure contemplates that the bottom Si atoms shown in FIG. 8C can be bonded in a side-by-side configuration to the Si atoms shown in FIG. 8A.

Benefits of the present disclosure include localized control and spatial control of deposition of SAM layer(s); simplicity and reduced complexity of operations; reduced costs; reduced consumption of materials; reduced or eliminated vaporization of SAM materials; reduced or eliminated contamination of SAM materials; and time-efficiency. The present disclosure facilitates localized patterning of SAM layer(s) in a manner that is relatively quick, simple, and cost-efficient.

It is contemplated that one or more aspects disclosed herein may be combined. As an example, one or more aspects, features, components, and/or properties of the inkjet printing platform 100, the inkjet chamber 104, the inkjet printer 200, the processing apparatus 304, the method 500, the operation flow shown in FIGS. 6A-6D, the operation flow shown in FIGS. 7A-7D, and/or the bond structure(s) shown in FIGS. 8A-8C may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof. The present disclosure also contemplates that one or more aspects of the embodiments described herein may be substituted in for one or more of the other aspects described. The scope of the disclosure is determined by the claims that follow.

What is claimed is:

1. A method of forming a self-assembled monolayer (SAM) structure, the method comprising:
- positioning a substrate in an inkjet chamber;
- printing one or more SAM layers on a substrate surface of the substrate in a localized manner such that a portion of the substrate surface is left exposed to a processing region of the inkjet chamber, the printing comprising:
  - spraying one or more subsections of the substrate surface with an ink, the ink comprising a SAM composition, and the SAM composition comprising:
    - an active component, and
    - a hydrophobic tail;
- allowing the one or more SAM layers to react with the substrate surface; and
- removing upper sections of the one or more SAM layers after the allowing of the one or more SAM layers to react with the substrate surface.

2. The method of claim 1, wherein the one or more SAM layers include a plurality of SAM layers printed in a spatial manner such that a first SAM layer is spaced from a second SAM layer.

3. The method of claim 1, further comprising forming one or more layers over the portion of the substrate surface.

4. The method of claim 1, further comprising activating the substrate surface prior to the printing of the one or more SAM layers, and the activating comprises exposing the substrate surface to one or more of an oxygen plasma, UV light, or ozone.

5. The method of claim 1, further comprising removing one or more portions of the one or more SAM layers after the allowing of the one or more SAM layers to react with the substrate surface.

6. The method of claim 1, wherein the substrate surface comprises silanol, and the SAM composition reacts with the silanol to form siloxane.

7. The method of claim 1, wherein the SAM composition further comprises one or more of a polymer or an oligomer.

8. The method of claim 7, wherein the polymer includes one or more of a copolymer, perfluoropolyether (PFPE), polyethylene glycol (PEG), polydimethylsiloxane (PDMS), polypropylene glycol (PPG), polyacrylate, one or more polymethacrylates, polystyrene, or one or more derivatives thereof.

9. The method of claim 7, wherein the one or more SAM layers are allowed to react with the substrate surface at a reaction temperature, and the polymer has a glass transition temperature (Tg) that is less than the reaction temperature.

10. The method of claim 7, further comprising curing the one or more SAM layers to cure the polymer prior to the allowing of the one or more SAM layers to react with the substrate surface, the curing including one or more of ultraviolet (UV) curing or thermal curing.

11. The method of claim 7, wherein the SAM composition further comprises one or more of a solvent or an additive, wherein:

- the solvent includes one or more of an organic alkane, an alkene, alcohol, an ester, an ether, a carbonate, or a fluorinated solvent; or
- the additive includes one or more of: one or more amphiphilic materials, one or more copolymers, or one or more charged molecules.

12. The method of claim 1, wherein each of the upper sections includes a polymer matrix, and the removing of the upper sections comprises stripping the upper sections using a solvent that is organic or water.

13. The method of claim 1, wherein the active component includes one or more of silane, thiol, amine, acid, or alcohol.

14. The method of claim 13, wherein the hydrophobic tail includes one or more C1-C20 Alkanes having a back bond that is linear or branched, and the one or more C1-C20 Alkanes are perfluorinated, partially fluorinated, or non-fluorinated.

15. The method of claim 14, wherein the hydrophobic tail includes one or more of an ether, an ester, an amide, a ketone, a vinyl, an alkynyl, a carbonate, or a urethane.

16. The method of claim 13, wherein the hydrophobic tail includes one or more of a copolymer, polyethylene glycol (PEG), polydimethylsiloxane (PDMS), polypropylene glycol (PPG), polyacrylate, one or more polymethacrylates, polystyrene, or one or more derivatives thereof.

17. A system for processing substrates, comprising:

- an inkjet chamber configured to conduct a printing operation;
- a stage positioned in the inkjet chamber;
- an inkjet printer head positioned in the inkjet chamber;
- an activation chamber configured to conduct an activation operation;
- a curing chamber configured to conduct a curing operation; and
- a controller communicatively coupled to the stage, the inkjet printer head, the activation chamber, and the curing chamber, the controller comprising instructions that, when executed, cause a plurality of operations to be conducted, the plurality of operations comprising:
- the operations of the method of claim 1.

18. The system of claim 17, further comprising:

- a reaction chamber configured to allow the reaction to occur at a reaction temperature; and
- a film formation chamber configured to conduct a film formation operation.

19. A non-transitory computer readable medium comprising instructions that, when executed, cause a plurality of operations to be conducted, the plurality of operations comprising:

- activating a substrate surface of a substrate;
- printing one or more SAM layers on the substrate surface of the substrate in a localized manner such that a portion of the substrate surface is left exposed, the printing comprising:
  - spraying one or more subsections of the substrate surface with an ink, the ink comprising a SAM composition, and the SAM composition comprising:
    - an active component, and
    - a hydrophobic tail;
- curing the one or more SAM layers;
- allowing the one or more SAM layers to react with the substrate surface; and
- removing upper sections of the one or more SAM layers after the allowing of the one or more SAM layers to react with the substrate surface.

20. A method of forming a self-assembled monolayer (SAM) structure, the method comprising:

- positioning a substrate in an inkjet chamber;
- printing one or more SAM layers on a substrate surface of the substrate in a localized manner such that a portion of the substrate surface is left exposed to a processing region of the inkjet chamber, the printing comprising:
  - spraying one or more subsections of the substrate surface with an ink, the ink comprising a SAM composition, and the SAM composition comprising:
    - an active component,
    - a hydrophobic tail, and
    - a polymer; and
- allowing the one or more SAM layers to react with the substrate surface, the one or more SAM layers allowed to react with the substrate surface at a reaction temperature, and the polymer has a glass transition temperature (Tg) that is less than the reaction temperature.

21. The method of claim 20, wherein the SAM composition further comprises an oligomer.

* * * * *